United States Patent
Burk et al.

(10) Patent No.: US 10,577,136 B2
(45) Date of Patent: Mar. 3, 2020

(54) DEVICE FOR MOVING OBJECTS

(71) Applicant: WEBER MASCHINENBAU GmbH BREIDENBACH

(72) Inventors: Alexander Burk, Dautphetal (DE); Christoph Eckhardt, Breidenbach (DE); Jochen Gerlach, Dautphetal (DE); Marco Nichau, Bad Laasphe (DE); Thomas Nispel, Dautphetal (DE); Ingo Rother, Breidenbach (DE); Leopold Von Keudell, Salem (DE); Steffen Zecher, Staufenberg (DE); Gerd Lischinski, Schönbeck (DE)

(73) Assignee: WEBER MASCHINENBAU GMBH BREIDENBACH (DE)

( * ) Notice: Subject to any disclaimer, the term of this patent is extended or adjusted under 35 U.S.C. 154(b) by 0 days.

(21) Appl. No.: 15/538,090

(22) PCT Filed: Dec. 21, 2015

(86) PCT No.: PCT/EP2015/080706
§ 371 (c)(1),
(2) Date: Oct. 30, 2017

(87) PCT Pub. No.: WO2016/102417
PCT Pub. Date: Jun. 30, 2016

(65) Prior Publication Data
US 2018/0265230 A1 Sep. 20, 2018

(30) Foreign Application Priority Data

Dec. 22, 2014 (DE) .................. 10 2014 119 351

(51) Int. Cl.
*B65G 47/94* (2006.01)
*B65B 5/06* (2006.01)
(Continued)

(52) U.S. Cl.
CPC .......... *B65B 5/068* (2013.01); *A22C 17/0093* (2013.01); *B07C 3/087* (2013.01);
(Continued)

(58) Field of Classification Search
None
See application file for complete search history.

(56) References Cited

U.S. PATENT DOCUMENTS 4,573,413 A 3/1986 Eberle
5,301,790 A * 4/1994 Prydtz .................. B65G 47/962
198/349

(Continued)

FOREIGN PATENT DOCUMENTS

DE 19817255 C1 9/1999
DE 10019848 A1 10/2001
(Continued)

OTHER PUBLICATIONS

International Preliminary Report; International Application No. PCT/EP2015/080706; International Filing Date: Dec. 21, 2015; 8 pages.
(Continued)

*Primary Examiner* — Kavel Singh

(57) ABSTRACT

The invention relates to a device for moving objects, in particular portions, each portion comprising at least one slice cut from a food product, comprising a plurality of individually movable transport movers for at least one object each, a track system for the transport movers, in which the transport movers can be moved along at least one specified track in a transport direction, and a control apparatus for controlling the motions of the transport movers in the track system, wherein at least one track segment and/or at least one transport mover has at least one support, which is frame-free at every point in time or at least at times, for at
(Continued)

least a part of a holder, in particular a bowl-like holder, for holding at least one object to be transported, in particular for a packaging or a part of a packaging, preferably for a tray for holding at least one portion, and wherein, in addition to the support, fastening means are provided, which are designed to fasten the holder to the support at least at times.

21 Claims, 10 Drawing Sheets

(51) Int. Cl.
    *B65B 25/06*     (2006.01)
    *B65G 54/02*     (2006.01)
    *A22C 17/00*     (2006.01)
    *B07C 3/08*     (2006.01)
    *B26D 7/32*     (2006.01)
    *B65B 35/24*     (2006.01)
    *B65B 43/56*     (2006.01)
    *B65G 47/96*     (2006.01)

(52) U.S. Cl.
    CPC .............. *B26D 7/32* (2013.01); *B65B 25/06* (2013.01); *B65B 35/24* (2013.01); *B65B 43/56* (2013.01); *B65G 47/962* (2013.01); *B65G 54/02* (2013.01)

(56) References Cited

U.S. PATENT DOCUMENTS

| | | | | |
|---|---|---|---|---|
| 5,388,681 A * | 2/1995 | Bonnet | ................. | B65G 15/30 198/477.1 |
| 6,082,522 A * | 7/2000 | Polling | ................. | B65G 47/962 198/370.04 |
| 6,135,262 A * | 10/2000 | Polling | ................. | B65G 47/962 198/370.04 |
| 8,381,897 B2 * | 2/2013 | Brunsen | ............... | B65G 47/962 198/370.04 |
| 8,807,320 B2 * | 8/2014 | Fortenbery | .......... | B65G 47/962 198/370.03 |
| 2004/0245075 A1 | 12/2004 | Brixius | | |
| 2006/0072990 A1 | 4/2006 | Suess | | |
| 2006/0260908 A1 | 11/2006 | Affaticati | | |
| 2009/0107806 A1 | 4/2009 | Mendenhall | | |

FOREIGN PATENT DOCUMENTS

| | | |
|---|---|---|
| DE | 102004030870 A1 | 2/2006 |
| DE | 102004035125 A1 | 2/2006 |
| DE | 102007059611 A1 | 6/2009 |
| DE | 202010011406 U1 | 11/2011 |
| EP | 0095068 A2 | 11/1983 |
| EP | 1002724 A1 | 5/2000 |
| EP | 1454856 A1 | 9/2004 |
| EP | 1475322 A1 | 11/2004 |
| EP | 2599721 A2 | 6/2013 |
| FR | 2355577 A2 | 1/1978 |
| FR | 2679201 A1 | 1/1993 |
| WO | 03029651 A2 | 4/2003 |
| WO | 2005110898 A2 | 11/2005 |
| WO | 20100085670 A1 | 7/2010 |
| WO | 2012150082 A1 | 11/2012 |
| WO | 2013031740 A1 | 3/2013 |
| WO | 2013044395 A1 | 4/2013 |
| WO | 2016102417 A1 | 6/2016 |

OTHER PUBLICATIONS

International Search Report; International Application No. PCT/EP2015/080706; International Filing Date: Dec. 21, 2015, 4 pages.

* cited by examiner

DEVICE FOR MOVING OBJECTS

CROSS-REFERENCES TO RELATED APPLICATIONS

This patent application is a 371 of International Application No. PCT/EP2015/080706, filed Dec. 21, 2015 which claims the priority of German Application No. 102014119351.2, filed Dec. 22, 2014, each of which are incorporated herein by reference in their entirety.

The invention relates to an apparatus for moving objects by means of transport movers guided in a path system as well as to a system composed of such an apparatus and a receiver for an object to be moved.

Such apparatus and systems are used, e.g. in the food industry, to move or transport objects such as stacks of slices of sausage or of cheese between different handling and processing stations. In this process, the transfer of the object from the processing station to the transport mover or from the transport mover to a further processing station represents a special challenge. For the objects are frequently mechanically sensitive, adhere to a support surface due to their greasy surfaces and are mechanically yielding so that handling is made more difficult. A technically complex solution, e.g. using a robot, must therefore frequently be made use of in the handling to transfer the objects carefully and nevertheless at a sufficient speed between a processing station and a transport mover. This in particular, but not only, applies on the transfer from the transport mover to a further processing station, that is for the procedure of the delivery of the object from the transport mover.

It is the object of the invention to simplify the transfer of objects from or to the transport movers in an apparatus for moving objects of the initially named kind.

This object is satisfied by an apparatus having the feature of claim 1 and in particular in that at least one transport mover has at least one support that is free of a frame at all times or at least at times for at least a part of a receiver, in particular of a bowl-like receiver, for receiving at least one object to be moved, in particular for a packaging or for a part of packaging, preferably for a tray for receiving at least a portion, and wherein fixing means are provided in addition to the support that are configured for an at least time-wise fixing of the receiver on the support.

In accordance with this aspect of the invention, a support for the receiver is provided at the side of the transport mover. A path-side support for the mount at a different point is also presented as a further aspect of the invention.

An advantage of the invention for both aspects is generally that no frame has to be overcome on the receiving or delivering of the receiver on the support. The apparatus for moving objects is thus simplified. The delivery of the receivers from the transport mover is also facilitated because no frame is in the way at least at times. The receivers are, however, nevertheless held securely on the support of the transport mover by the fixing means when this is necessary. A holding of a receiver on the support is necessary at least at times during the transport, that is while the respective transport mover is moved in the path system, and indeed above all whenever the receiver or an object located therein is accelerated, and indeed both in the movement direction and when cornering due to centrifugal forces.

The fixing means are in particular also configured for fixing the receiver on the support when picking up and/or for releasing the receiver when delivering from the support.

As already mentioned, the objects to be moved in both aspects of the invention are in particular food products, preferably portions of one or more slices that are cut off from a product, e.g. from a loaf of sausage or cheese, for example by means of a high performance slicer. The receivers for the portions can in particular be lower packaging parts that are also called trays. The portions are either placed into the trays by suitable handling means or are cut directly into the trays. The handling of packaging parts or trays and thus so-to-say an indirect dealing with the food portions is advantageous with respect to a direct handling of the foods under hygienic aspects.

As is generally known to the skilled person, trays—or generally parts or lower parts of packagings used for food portions such as slices of sausage or cheese—can, for example, be manufactured from a plastic foil in a deep drawing method. Such trays are in particular shape stable. The trays can also be molded plastic parts or in particular molded foamed bodies. The packagings or trays can be manufactured in a large variety of shapes, formats and sizes. Trays can have an increased marginal region and can be formed in the manner of a tray and/or at least substantially planar.

In an embodiment, the transport movers each comprise at least one runner cooperating with the path system, wherein at least one, and in particular each, transport mover comprises at least one carrier attached to the runner, said carrier forming the frame-free support or being connected to the frame-free support.

The object can comprise a packaging or a part of a packaging such as a so-called tray.

The drive for the transport movers can, for example, be formed as a linear motor, in particular as a linear synchronous motor or as a linear induction motor.

Such linear motors are generally known in connection with a plurality of applications. Such a drive principle is inter alia advantageous when comparatively small loads are to be transported such as is the case in the sector of the transport of food products in question here.

A transport system which can generally be used for the invention and to which reference will explicitly be made with respect to the requirement of performability of the invention is offered by the company MagneMotion, Inc., domiciled in Devens, Mass., USA. This system is based on a so-called LSM drive, that is on a drive by linear synchronous motors which is to be distinguished from a so-called linear induction motor (LIM drive). Unlike an LIM drive, in an LSM drive, a magnetic field is not induced by means of the so-called electromagnetic traveling field, but the magnetic field is provided by permanent magnets. When the runner of the linear motor carries the permanent magnets and the stator of the linear motor produces the electromagnetic traveling field, the drive principle of an LSM drive can be figuratively imagined such that the transport mover provided with the permanent magnet is pulled over the transport line by the magnetic field moving along the stator. Such a transport system or drive principle is described, for example, in WO 2003/029651 A2 and WO 2010/085670 A1. Reference is herewith explicitly made to these documents with reference to the disclosure of a possible drive principle or functional principle for the invention.

The path system or the individual paths of such a transport system can be divided into a plurality of consecutive path elements which so-to-say each form a single linear motor and can be individually controlled by a control device. If the transport movers located in the path system can be identified simultaneously by means of the control device, generally any desired number of transport movers can then be operated simultaneously in this manner in a path system of generally any desired complexity and can be individually moved in this respect.

The above-mentioned company MagneMotion, Inc. uses a technique for the identification and localization of the individual transporters in the path system in which each transporter mover is provided with a transducer which induces a signal in the stator formed by the path system, whereby it makes it possible for the control device to determine the exact position of the transporter with an accuracy dependent on the size of the total system of fractions of a millimeter or fractions of a centimeter. An advantage of this system comprises no external sensors being required. In the control system of the company MagneMotion, Inc., it is additionally ensured by a division of the paths into a plurality of path elements—which so-to-say each represent a single linear motor—that no collisions occur between the consecutive transporter movers. A transport mover can thus only travel into the next path element when it is permitted by the control device, which is in particular not the case when another transport mover is located in the path element.

Against the background of this generally known transport system, provision is made in a possible embodiment in the invention that the path system is configured as a stator of the linear motor.

The runner is in particular a respective component of a linear synchronous motor, with the runner in particular comprising at least one permanent magnet and the path system being configured as a motor stator.

The path system is preferably divided into a plurality of path elements which in particular each represent a single linear motor and which are individually controllable by the control device.

The transport movers are preferably identifiable by the control device.

The transport movers can furthermore preferably be localized in the path system by the control device.

The transport system has a plurality of transport movers whose total number depends on the respective application. Provision can be made that the path system comprises several dozen up to some hundred transport movers, i.e. a positive "cluster" of transport movers can be present in the path system to transport a plurality of portions and optionally to carry out additional functions such as a buffering, a distribution and/or an association of portions.

Within the framework of the invention, an object to be moved can e.g. comprise a product, a food product and/or a stack or—generally—a portion of e.g. slices of sausage or cheese. An object can also be a tray, a foil, a plate, a container and/or a tubular bag, in each case in particular for receiving a food product.

The term "portion" is to be understood as broad within the framework of the invention. A portion can accordingly consist of only one single slice. Alternatively, a portion can comprise a plurality of slices which can be present in a relative arrangement of generally any form, for example in a so-called stacked or overlapping arrangement such as is familiar to the skilled person in the technical field in question here. The portion can be a total portion such as is subsequently packaged and offered for sale on the market. Alternatively, the portion can be a part portion which only forms a total portion together with one or more further part portions which can in turn each comprise one or more slices. The part portions of a total portion can be formed from different product sorts so that a multi-sort portion can be produced by assembling a plurality of part portions and so that a multi-sort pack is thus present after its packaging. The slices can, for example, be comparatively thin slices such as are generally known in the form of assorted slices of sausage or of cheese. Alternatively, the slices can each be pieces that are relatively thick in comparison with assorted slices such as pieces of fresh meat.

In other words, a portion in applications in the food sector within the framework of the invention is the unit which is the smallest with respect to the transport task, which has to be transported over a specific line, on the one hand, and which optionally—depending on the application—additionally has to be put into relation with further portions, on the other hand, to satisfy the respective demands of the total system which comprises one or more slicing apparatus, in particular slicers, the path system, and one or more packaging apparatus, for example with respect to the formation of formats such as have to be provided for the respective provided packaging machine.

A transport mover can transport one or more objects or portions. It is alternatively also possible that a plurality of transport movers, in particular two transport movers, transport an object together. The transport movers can in this respect so-to-say be moved together as a unit on the path system. In this manner, larger loads, in particular heavier portions and/or objects larger in area, can also be moved on the path system than with only one transport mover.

Provision is made in accordance with an embodiment that the fixing means comprise a mount or a suspension for the support at the transport mover that is configured to permit a change of the orientation of the support, in particular an inclination of the support, relative to the transport mover, with the mount in particular comprising a pendulum-like mount and/or the suspension comprising a gimballed suspension for the support.

It is in particular possible in this manner that the mount can compensate centrifugal forces that act on the receiver to be transported or on the object to be transported by inclining or slanting the support or a carrier of the transport mover.

Since such a mount or suspension is able to hold a receiver or an object on the transport mover, i.e. it represents a measure without which the receiver or the object would be at risk of falling from the transport mover, such a mount or suspension represents fixing means in the sense of the invention.

Independently of whether such a mount or suspension is considered as a fixing means or not, protection for such a mount or suspension of a support or of a carrier of a transport mover of the kind described here is herewith explicitly independently claimed, and indeed also independently of whether additional fixing means such as are described above and below are present or not.

In an embodiment, a device supported by centrifugal force is provided for delivering the receiver from the support. Forces anyway present e.g. during cornering can thereby be used for delivering the object. This can, for example, be effected by a gap in a path-supported guard rail for the object or by a frame for the object that opens or disappears at times or by exceeding static friction between the support and a base region of the object.

In an embodiment, the fixing means are configured for generating a retaining force that is substantially effective in a horizontal direction and/or in a plane in parallel with the transport direction. The object is thereby secured against lateral slipping and unwanted delivery. The fixing means in this respect themselves in particular act with a force that is directed substantially vertically, namely in particular in the direction of the support, in particular downwardly.

In an embodiment, the fixing means are configured to fix the receiver by static friction, with the fixing means in particular being provided in the form of a friction-increasing surface of the frame-free support. This represents a simple kind of fixing on a use of a frame-free support and the object is better secured on the support. The friction-increasing surface can e.g. comprise an elastomer material, a rubber and/or a rough surface.

In an embodiment, the fixing means are configured to fix the receiver by adhesion, with the fixing means in particular being provided in the form of an adherent layer or of an adhesive layer or in the form of one or more singular adherent points or adhesive points on the frame-free support. The securing of the object on the support is thereby further improved.

In an embodiment, the fixing means are configured to fix the receiver by means of vacuum, with the fixing means in particular comprising at least one suction device, preferably a plurality of suction devices arranged in a distributed manner. This represents a further possibility of further improving the securing of the object on the support in a comparatively simple and nevertheless reliable manner.

In an embodiment, the fixing means are adjustable between a fixing position and a release position. The fixing means are in this respect therefore so-to-say switchable and the fixing and the delivery of the object can be selectively supported. The fixing means are in particular adjustable by means of an actuation device provided at least partly outside the respective transport mover, preferably at the path system. An active actuation device at the transport mover can thereby be dispensed with. The transport mover thus does not need its own energy supply for operating an actuation device and the apparatus is further simplified. The actuation device can e.g. be arranged at the path system in a stationary manner.

In an embodiment, the fixing means are adjustable by passing an actuation point that is in particular provided at the path. This so-to-say represents a passive actuation device that does not require any special switching apparatus, e.g. of an electromechanical, hydraulic or pneumatic kind. An actuation device can act by a transport mover traveling past and can in this respect e.g. be configured in the form of a run-on chamfer at the path system that effects an adjustment of the fixing means by the movement of the transport mover in cooperation therewith. The actuation apparatus can, however, also comprise a control and/or can trigger the adjustment of the fixing means in an e.g. mechanical and/or electromechanical manner. The actuation point can itself be adjustable and/or settable.

In an embodiment, fixing means adjustable between a fixing position and a release position form at least a part of the support. In this respect, the fixing means, for example, comprise one or more spring clips bendable by means of a chamfer or ramp in the release position. The adjustability of the fixing means can thereby be implemented in an extremely simple manner in that the movement of the transport mover in the path system is used to move the adjustable fixing means, for example elastic elements.

In an embodiment, the fixing means comprise a clamping device that is configured to fix the receiver at one or more clamping points. The object is thus better secured at the support.

In an embodiment, the clamping device is configured to clamp the mount between at least one clamping member, in particular an adjustable clamping member, and the frame-free support. The receiver or the object is thereby held particularly securely between the clamping member and the support. The term adjustable can here include the meaning that the clamping member can adapt to an associated contact geometry of the receiver.

In an embodiment, the support is provided with a non-planar topography as the fixing means. In this respect, the topography in particular has one or more recesses and/or one or more elevated portions. The topography of the support can thereby cooperate with a topography that may be present and that is at least partly matching at a lower side of the receiver or of the tray to fix the receiver and thus an object received therein securely at the support.

In an embodiment, the fixing means comprise one or more elevated portions that project beyond a support surface of the support in a fixing position, with the or each elevated portion in particular being adjustable between a fixing position and a release position and preferably being lowerable into or beneath the support surface. A support with matching elevated portions or with recesses present between the elevated portions can thereby be selectively fixed, whereby the apparatus can be used more flexibly.

In an embodiment, the fixing means for at least a part of a support surface of the support comprise a single-part or multi-part boundary or enclosure that is adjustable relative to the support surface, in particular in an at least substantially vertical direction. The object can thus be secured without a clamping of the receiver on the support. The support surface is preferably raisable to release the receiver and lowerable to fix the receiver. The receiver can in this respect so-to-say be arranged on a kind of lift by which the receiver can be moved to the respectively required level.

A vertical movement of the support surface preferably takes place by an influence from outside, i.e. by means of corresponding means, in particular mechanical means, at a path section. These means can e.g. be run-on chamfers or ramps.

In an embodiment, the fixing means are configured to incline the support at least at times, in particular for movements in corners. The object can thereby be fixed without fixing means engaging directly and mechanically at the object. The object is thus preserved and the delivery and receiving of the object by the transport mover thereby becomes a lot more flexible.

The inclination is in this respect in particular generated in a manner supported by centrifugal force. This can e.g. be achieved by a pendulum that is coupled, in particular fixedly, to a support that is mounted in an inclinable manner whose pendulum mass is urged outwardly during cornering due to centrifugal force, with the pendulum mass in particular being arranged beneath the axis of inclination. An inclination of the support can alternatively or additionally be used for delivering the object from the support in conjunction with the gravity of the object. The support or the carrier can furthermore also be inclined by corresponding guides at least in part regions of the path system. A support or a carrier can, for example, run onto a slightly raised guide in corners and can thereby be inwardly inclined for compensating centrifugal forces.

An inclination of the support can not only be effected by fixing means, but also, e.g. alternatively or additionally, by a carrier and/or by the support itself. For this purpose, a carrier is e.g. oscillatingly mounted or gimballed at the respective transport mover so that the mounting or the suspension can compensate centrifugal forces on the object to be conveyed by inclining or slanting the carrier.

In an embodiment, the fixing means are provided by a deformability of the support at least region-wise, with a bed for the receiver in particular being shapable in the support, in particular by placing and/or pressing the receiver onto or into the support respectively. The support can thereby be adapted to the object. The bed is in particular an e.g. depression-like recess in which the object is received and by which the object is held and/or fixed. A secure hold of the object is thereby ensured, in particular during cornering of the transport mover.

In an embodiment, a guide for the receiver is associated as a fixing means with a path-supported support for the receiver. A transport mover controlled to push or pull the receiver thereby does not have to provide either the support or the guide of the receiver or of the tray. The transport mover can thereby be designed in a simpler manner.

In an embodiment, the support is formed by at least one of two transport movers moved toward one another, with at least one of the transport movers having a support region for a receiver held between the transport movers, with at least one of the transport movers in particular forming or having a boundary for the receiver. The transport movers can thus be designed in a technically simple manner and thus less expensively. In this respect, the fixing means can be provided by the control device in that the control device keeps the transport movers at the correct distance. Alternatively or additionally, the fixing means can be formed by support regions and/or by their boundaries that may be present.

In an embodiment, the support and/or the boundary is formed by the transport movers together, whereby the design of the individual transport movers is further simplified and the object can nevertheless be reliably held.

In accordance with a further embodiment, the boundary is configured for receivers of different sizes and/or different shapes. The apparatus for moving objects is thereby more flexibly usable, with e.g. objects having different receivers, in particular having receivers of different shapes or having receivers of different formats being able to be moved e.g. also without conversion of the transport movers and being able to be reliably secured in so doing. In this respect, the boundary, for example, has a square or rectangular base shape with chamfered or rounded corner regions.

In an embodiment, the fixing means for at least a part of a support surface of the support comprise a single-part or multi-part boundary or enclosure that is pivotable or tiltable relative to the support surface between a fixing position and a release position. In this respect, the tilt axis or pivot axis in particular extends in parallel with the support surface and in particular in parallel with the movement direction of the transport mover. The tilt can in particular be effected by actuation means arranged at the path side. In the tilted state, at least one opening or at least one passage is present between the support surface and the boundary or enclosure through which the receiver can be transferred. It can in particular be achieved that two openings or passages for the object to be transported are created by a tilting procedure at oppositely disposed sides of the support surface.

In accordance with a further embodiment of the invention, at least one pair of cooperating transport movers is provided that form, together with their receiving regions, a common, laterally protruding support region for the receiver at least. temporarily. The support regions are at least temporarily respectively in a protruding position in which they protrude to the side. The support regions are in particular each arranged offset from a stator of the path system, from a runner of the transport mover and/or from a guide for the runner.

The receiving region in particular protrudes in this respect relative to the path or to the runner of the transport mover. The support region is preferably a carrier region, a load receiving region or a load delivery region, that is a region in which the receivers, in particular the trays, are received, handled, carried and/or delivered. The support region is preferably a receiving surface for the trays.

The support can in particular only protrude at one single side. It is, however, generally also conceivable that the support has a plurality of receiving regions that protrude laterally. Due to the support region, the support is preferably asymmetrical with respect to the path, in particular with respect to the stator or the runner.

The at least one mover pair provided in this embodiment acts as a kind of "tandem" in order to together provide a support region for trays.

It has been found that such a transport principle can be used particularly efficiently with transport movers having a laterally protruding support region. A common, laterally protruding support region can in this respect either only be provided at one side of the mover tandem, with the supports alternatively also being able to protrude at both sides.

In accordance with an embodiment, the two transport movers can be movable relative to one another for the delivery of trays such that the support regions are movable away beneath the trays. The relative movement preferably takes place so fast that the trays so-to-say have the "floor pulled from under their feet" using the inertia principle. For example, an intermediate space can arise by moving apart the two movers between the individual support regions previously forming the common support region. Depending on the properties of the trays, they can fall downward substantially without a lateral offset on a moving part of the movers if the support regions are moved away beneath the trays sufficiently fast.

In accordance with a further embodiment of the invention, at least one of the support regions of the two transport movers can be movable relative to a delivery aid cooperating with the trays on the delivery. The delivery aid can e.g. be configured as a scraper, as a scooper, as a peeler and/or as a position fixer.

Provision is in particular made that the delivery aid is attached to the other transport mover and/or is movable together with the other transport mover. Such delivery aids can prevent trays from moving away in an unwanted manner from a desired delivery position with the respective mover when the two movers are moved apart.

In accordance with a further embodiment, the two transport movers are coupled to one another by a length-variable coupling device. A greater movement stability can in particular be achieved by such a coupling device, which means a smaller influence on the trays that are simultaneously transported by two transport movers and that would otherwise be disturbed by relative movements between the two transport movers.

The coupling device can, for example, comprise one or more telescopic coupling elements. The coupling device is preferably rotatably or pivotably supported at at least one respective point at both transport movers.

In transport operation, the two transport movers can be controlled and can be moved in the path system such that the spacing of the two support regions does not vary. In this respect, the "part supports" formed by the support regions can be disposed at a small spacing opposite from one another. The part supports can alternatively also overlap or contact one another, however.

The object of the invention is furthermore satisfied in that at least one path section has at least one support, in particular a support free of a frame at all times or at least at times, for at least a part of a receiver, in particular of a bowl-like receiver, for receiving at least one object to be moved, in particular for a packaging, preferably for a tray for receiving at least one portion, and wherein the receiver lying on the support of the path section is movable by means of at least one transport mover along the path, with the transport mover in particular being configured for pushing and/or pulling the receiver.

In accordance with this aspect of the invention, the support of the receivers takes place by the path, while the transport movers still provide the movement of the receivers along the path, i.e. its movement is imparted onto the receivers by the transport movers.

Instead of a receiver for one or more objects to be transported, said objects can also lie directly on the path section and can be moved by means of one or more transport movers. Protection is herewith explicitly also independently claimed for such a direct handling of objects supported at the path.

Fixing means for the receivers can likewise be provided by the path. A guide for the receivers can in particular be provided in the region of the support, e.g. in the form of an angled metal sheet, whose one limb serves as a support and whose other limb serves as a guide. The transport movers in this respect consequently do not have to take over any fixing work, but rather only have to provide the movement of the receivers. Alternatively, path-supported fixing means can also be dispensed with when the transport movers are e.g. configured such that they not only provide the movement of the receivers, but can simultaneously ensure that the receivers remain on the path. Means provided at the transport movers for pushing and/or pulling the receivers lying on the path can, for example, additionally be configured as holding means, clamping means or engagement means that hold the receivers and act as fixing means in this sense.

Provision can furthermore be made that fixing means are provided in addition to the support that are designed for an at least time-wise fixing of the receiver on the support. The fixing means can be provided at the transport mover and/or at the path section. If path-supported fixing means are provided, they can in particular comprise a guide.

If a path-side support is provided in accordance with this aspect of the invention, the advantages indicated above in accordance with the invention are therefore implemented at the static side of the path system. All the embodiments mentioned above and below in connection with the aspect of the support at the side of the transport mover can also be provided with this support at the path side.

The object of the invention is furthermore satisfied by a system having an apparatus in accordance with the invention and having at least one receiver, in particular a bowl-like receiver, for receiving at least one object to be moved by means of the apparatus.

Provision can be made in this respect in accordance with an embodiment that the receiver, in particular its lower side, and the support have cooperating fixing means that are configured such that the receiver is fixed on the support at least at times by the cooperation of the fixing means.

This system in accordance with the invention can likewise be advantageously further developed in the sense of the embodiments of the apparatus named in the above and in the following.

In an embodiment, the fixing means are configured as shape matching means, whereby a secure fixing of the receiver is ensured. The trays or the lower packaging parts and the transport movers can in this respect be matched to one another, i.e. the shape of the trays is known beforehand.

In an embodiment, the support and the receiver are provided with non-planar topographies that match one another at least region-wise and that in particular each have one or more recesses and/or one or more elevated portions. In this respect, discrete projections that are e.g. designed in dot form or in elongated form can, for example, move on the tray into engagement with corresponding recesses on a lower tray side.

In an embodiment, the receiver is configured to engage around and/or to engage behind the support and/or to engage laterally past the support beneath a support surface of the support at least region-wise. The receiver is thus securely fixed to the support.

Further embodiments are shown in the dependent claims, in the description and in the drawing.

All the measures disclosed here for fixing receivers on the supports of the transport movers can also be used for a direct fixing of the objects on the transport movers, that is in particular on the supports, on carriers or on surfaces or support surfaces provided by the supports or carriers respectively. An indirect transport of objects by means of receivers or trays is therefore not compulsory for the invention. In other words, the receivers or trays can themselves be considered as objects to be transported. Protection is thus also claimed independently for such direct fixing arrangements of objects at transport movers.

The invention will be described in the following only by way of example with reference to the schematic drawing.

Figure 19:
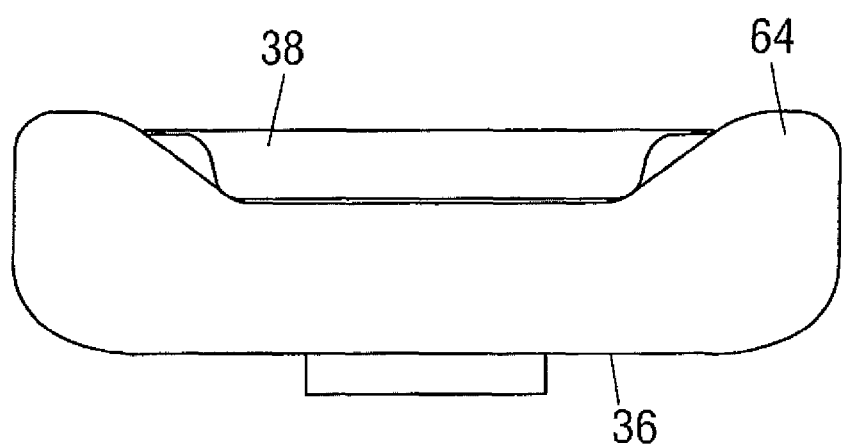
Figure 20:
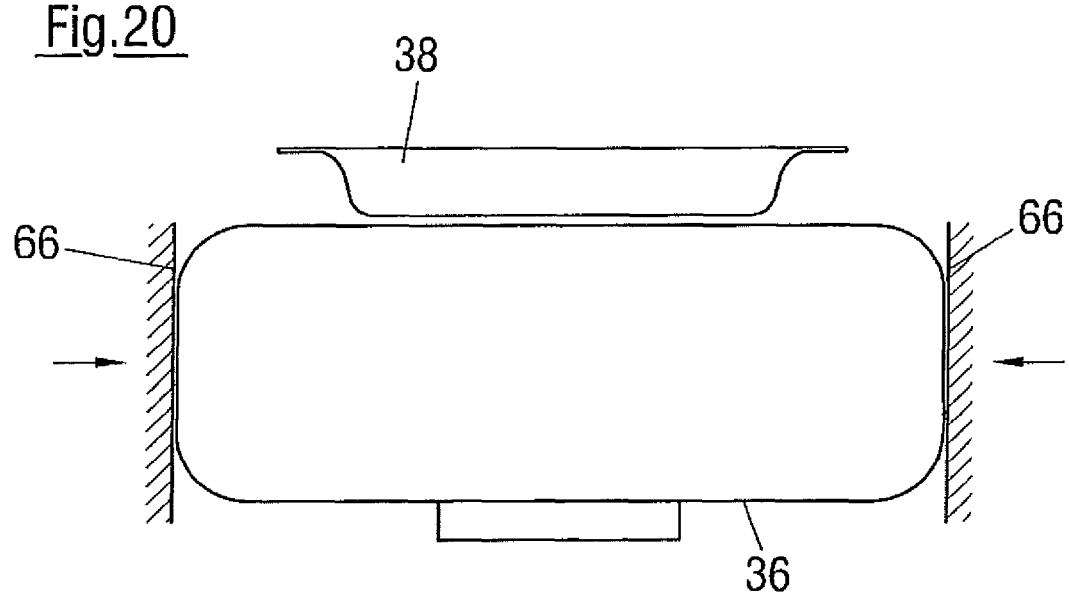
Figure 21:
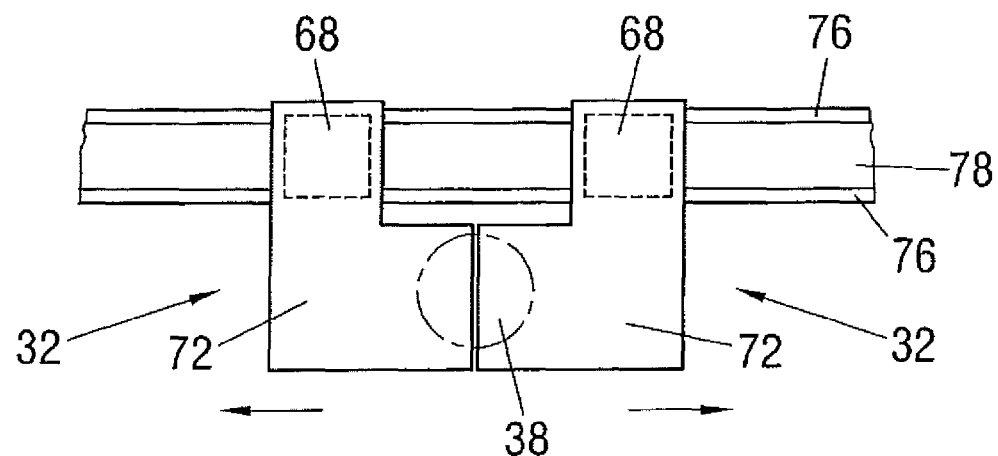
Figure 22:
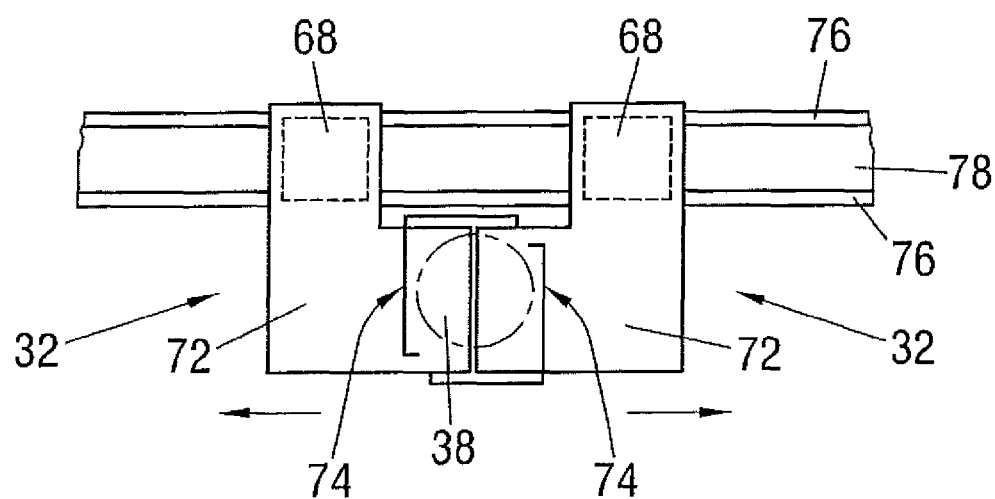

FIG. 20 sows the deformable support of FIG. 19 after a deformation by laterally engaging jaws; and FIGS. 21 and 22 show plan views of two further embodiments of the invention that each relate to a "tandem mover".

Figure 1:
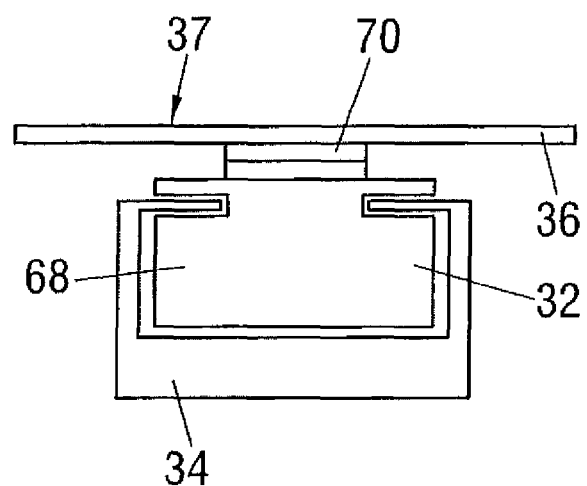
FIG. 1 shows a transport mover of an apparatus in accordance with the invention having a non-slip surface.

A transport mover 32 having a support 36 is shown in FIG. 1 and is mounted in a path system 34. The transport mover 32 is moved through the path system 34 via a magnet that is arranged at the transport 32 by means of varying magnetic fields. In this respect, the transport mover 32 follows a movement path that extends perpendicular to the image plane of FIG. 1. The path system 34 is therefore shown sectioned in FIG. 1. The transport mover 32 comprises a runner 68 for guiding the transport mover 32 in the path system 34 and a carrier 70. The carrier 70 has a support 36 for placing on a receiver, not shown. A surface 37 of the support 36 has a non-slip rubber to secure an object on the support 36 from lateral slipping, e.g. as a consequence of a centrifugal force during cornering.

Figure 2:
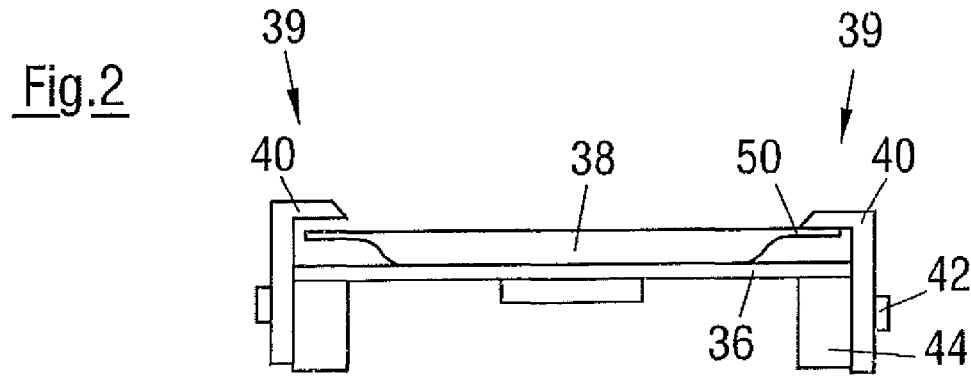
FIG. 2 shows a support of a transport mover having clamping members.

FIG. 2 shows a support 36 of a transport mover 32, not shown, that carries a receiver designed as a tray 38 for an object that is not shown. The support 36 has at its lateral ends two clamping devices 39 that are configured to fix the tray 38 on the support 36. A clamping device 39 has a clamping member 40 that is adjustable in a vertical direction between a fixing position (shown at the right in the image) and a release position (shown at the left in the image). The clamping member 40 clamps the tray 38 over a margin 50 of the tray 38 with respect to the support 36, with a clamping force being applied in the vertical direction. The clamping device 39 additionally comprises an actuation nose 42 that is fixedly connected to the clamping member 40. The clamping member 40 can be adjusted via the actuation nose 42 by an actuation device, e.g. a run-on chamfer, arranged at the path side. The clamping device 39 furthermore comprises a bistable locking device 44 by means of which the clamping member 40 can be fixed in two different positions, namely in the fixing position and in the release position, with respect to the support 36.

Figure 3:
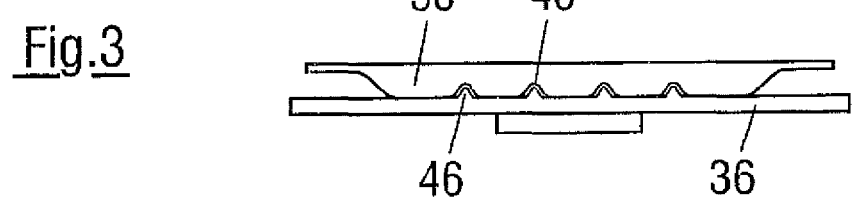
FIG. 3 shows a support having a topography for securing a tray.

A support 36 is shown in FIG. 3 that has a non-planar topography in the form of elevated portions 46. A tray 38 having recesses 48 is arranged on the support 36.

In this respect, the elevated portions 46 of the support engage into the matchingly shaped recesses 48 of the tray 38 to secure the tray 38 on the support 36 with respect to a movement in the horizontal direction.

Figure 4:
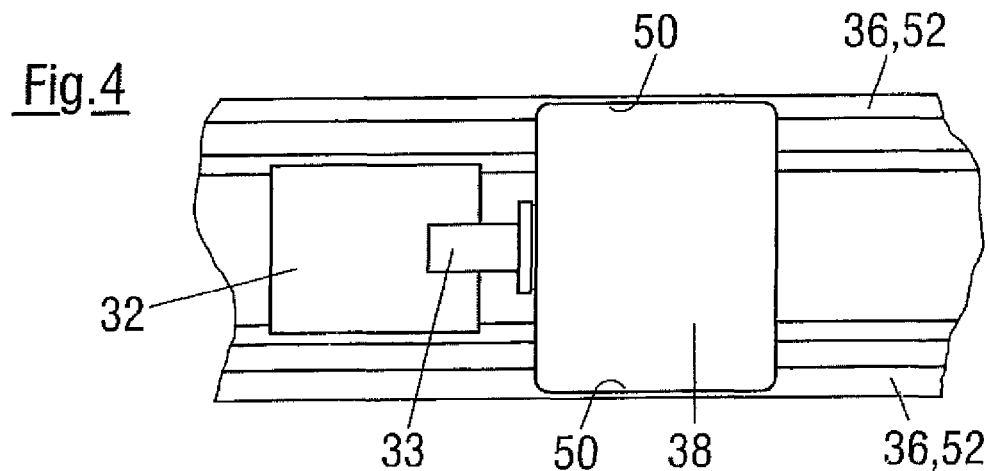
FIG. 4 shows a path system having a support for a tray.

A tray 38 is shown in a plan view in FIG. 4 whose margins 50 lie on two rails of a guide 52 simultaneously also forming a support for the tray 38. The guide 52 guides the tray 38 on a movement in a direction that is horizontal in the image, that is along the guide rails. The tray 38 is secured by the guide 52 against leaving the movement path, that is with respect to a movement in a vertical direction in the image. A transport mover 32 is shown between the rails of the guide 52. The transport mover 32 is movable along a movement path in the horizontal direction in the image. In this respect, the transport mover 32 projects over the tray 38 vertically, that is in the direction out of the image plane, or it projects over at least one feature of the tray vertically. The transport mover 32 can therefore push the tray 38 before it along the guide 52 and along its movement path to move the tray 38. The transport mover 32 is equipped with pushing means 33 for this purpose. The transport mover 32 can alternatively or additionally have means for pulling the tray 38 along the guide 52 such as an element engaging behind the tray 38. In this case, the transport mover 32 can pull the tray 38 behind it to move the tray 38 along the guide 52.

Figure 5:
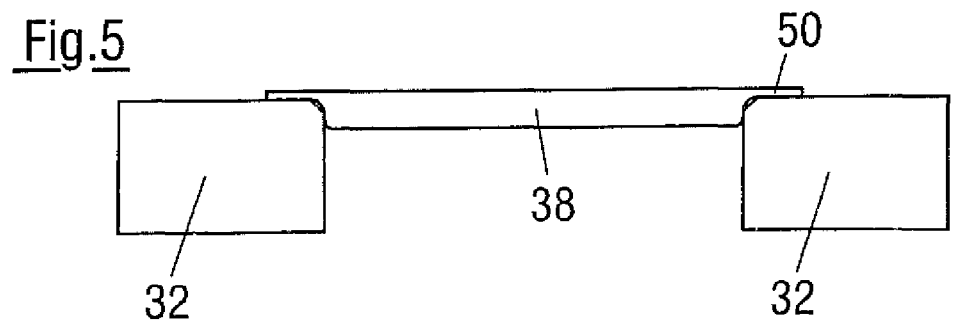
FIG. 5 shows two transport movers that hold a tray together.

FIG. 5 shows a tray 38 that is carried by two transport movers 32. The transport movers 32 therefore together form a support for the tray 38. In this respect, the margins 50 of the tray 38 each lie on the transport movers 32 or on attachment parts of the transport movers 32 provided of this purpose. The tray 38 is arranged and held by a depth feature between the transport movers 32. The tray 38 is therefore secured in the horizontal and vertical directions relative to the transport movers 32 that move synchronously and with a substantially constant spacing on the transport of the tray 38. The transport movers 32 are controlled by a control device, not shown, for moving in the horizontal direction in the image, said control device providing the spacing between the transport movers 32 remaining substantially the same for holding the tray 38. The spacing is increased to release or deliver the tray 38. If in this respect the spacing is increased by a small amount such as a few millimeters, the margins 50 of the tray 38 can still lie on the transport movers 32, but can be delivered by the transport movers 32 in the vertical direction (that is upwardly) or in the direction perpendicular to the image plane (that is transversely to the movement path). The tray 38 can thus e.g. slide out on the delivery between the transport movers 32 in a corner in the direction perpendicular to the image plane or can be pushed out laterally at any desired point in the path system 34 by means of an expulsion device. Alternatively, the spacing can also be increased by a large amount so that the tray 38 can fall downwardly or can also be raised upwardly to be delivered by the transport movers 32.

Figure 6:
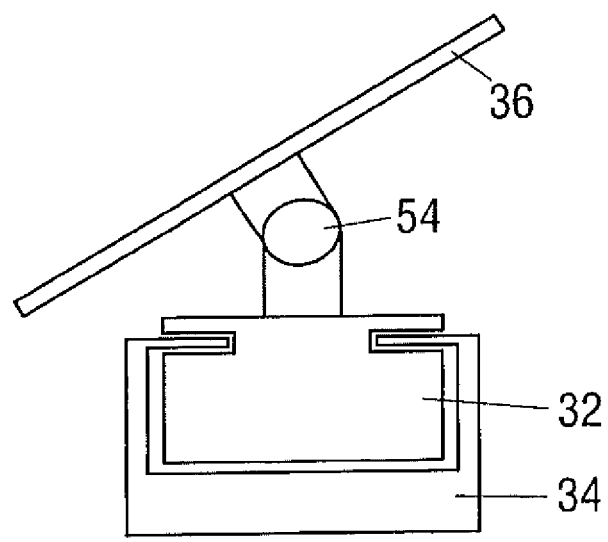
FIG. 6 shows a transport mover having an inclinable support.

FIG. 6 shows a transport mover 32 guided in a path system 34 whose support 36 is inclinable to the left and to the right by a tilt bearing 54. The inclination axis of the tilt bearing 54 extends in parallel with the movement path of the transport mover 32, that is perpendicular to the image plane in the illustration, and through the center of the tilt bearing 54. The support 46 can therefore e.g. be inclined for compensating a centrifugal force that acts on an object, not shown, carried by the support 36 during a cornering of the transport mover 32. The inclination of the support 36 can in this respect e.g. be effected by drive means of the transport mover 32 that are arranged in the tilt bearing 54 or by a pendulum mass fixedly connected to the support 36. The pendulum mass and the overall center of gravity of the inclinable apparatus part in this respect preferably lie beneath the axis of inclination so that on a cornering of the transport mover 32, the support 36 is inclined in the direction of the inside of the corner.

Figure 7:
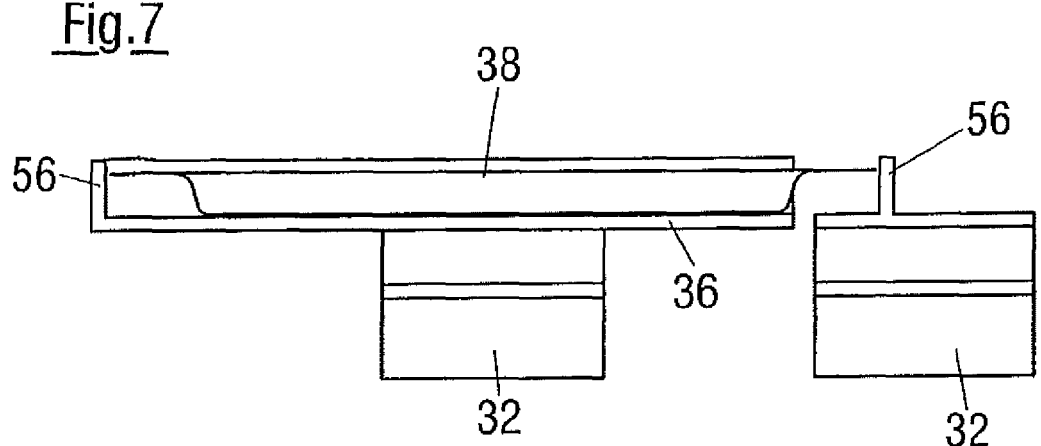
FIG. 7 shows two transport movers that together form a support and a boundary for a tray.

Two transport movers 32 are shown in a sectioned side view in FIG. 7 that are arranged horizontally movable in a path system 34, not shown. The transport mover 32 shown at the left has a support 36 for carrying a tray 38. The tray 38 is secured by boundaries 56 with respect to a horizontal displacement relative to the transport movers 32. In this respect, one of the boundaries 56, namely the one shown at the right, is formed at the transport mover 32 shown at the right. The transport movers 32 are in a fixing position relative to one another and are held at substantially the same spacing from one another by a control device, not shown, during a transport of the tray 38. The transport movers 32 thus together fix the tray 38 during the transport.

Figure 8:
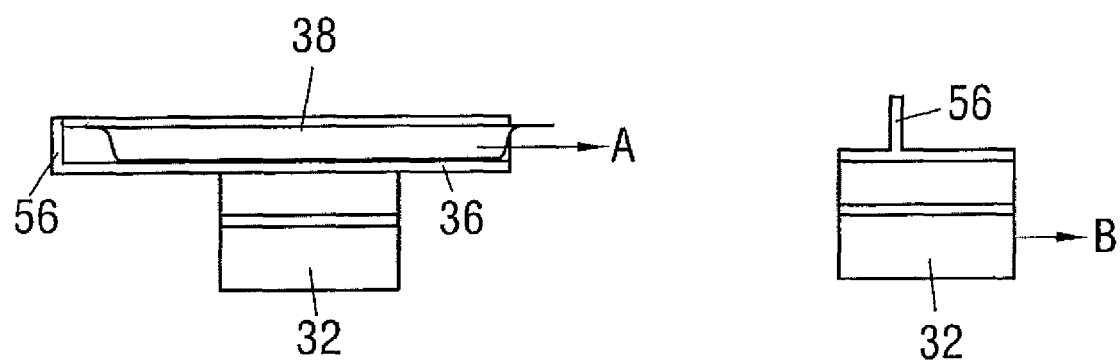
FIG. 8 shows the transport movers of FIG. 7 in a release position.

The transport movers 32 of FIG. 7 are shown in a release position in FIG. 8. To reach the release position, the transport mover 32 shown at the right is traveled to the right relative to the transport mover 32 shown at the left and the spacing between the two transport movers 32 is increased. The boundary 56 of the transport mover 32 shown at the right does not secure the tray 38 in this position. The tray 38 can therefore be delivered from the transport mover 32 shown at the left in the delivery direction A, that is to the right in the horizontal direction. The delivery direction A here extends in parallel with the transport direction B of the transport movers 32. An upward delivery is, however, e.g.

also conceivable, in particular also since the tray 38 can be grasped, in particular engaged beneath, particularly easily by auxiliary means in this situation.

Figure 9:
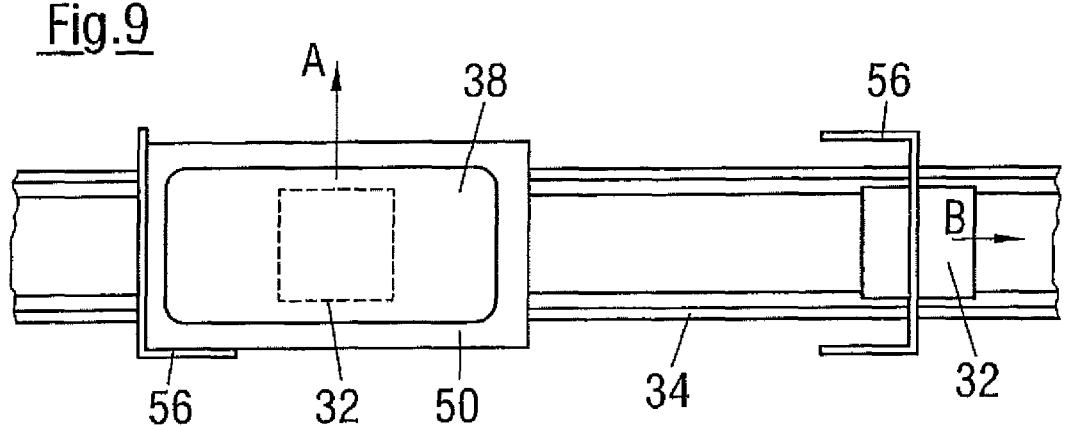
FIG. 9 shows a further embodiment of two transport movers that together form a support and a boundary for a tray.

FIG. 9 shows an alternative embodiment of two transport movers 32 that are configured to move a tray 38 together. The transport movers 32 move in a path system 34 along a transport direction B and are shown in a release position in FIG. 9. The transport mover 32 indicated at the left by dashed lines (because hidden) carries a tray 38 having a margin 50 and has an L-shaped boundary 56 for the tray 38. In the release position shown, the tray 38 can be delivered in the delivery direction A, that is transversely to the transport direction B, e.g. by means of a centrifugal force on a cornering of the transport mover 32 shown at the left. The transport mover 32 shown at the right likewise has a boundary 56 that together with the boundary 56 of the transport mover 32 shown at the left secures the tray 38 in a fixing position, not shown, with respect to a movement transversely to the transport axis B relative to the path system 34 and with respect to a movement in parallel with the transport direction B relative to the transport movers 32.

Figure 10:
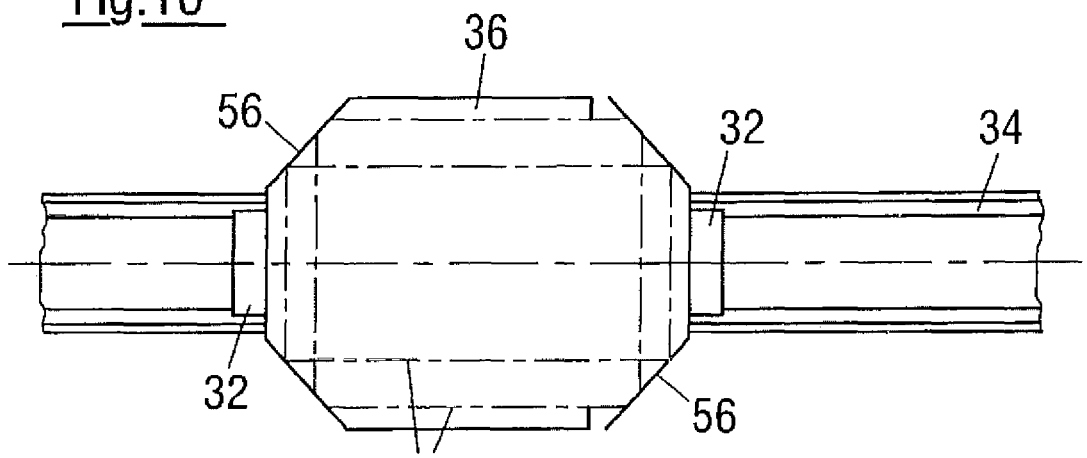
FIG. 10 shows two transport movers that together form a support and a boundary for different trays.

FIG. 10 shows an alternative embodiment of two transport movers 32 that are configured to carry and to secure a tray 38. The transport movers 32 are movably driven and guided in a path system 34 and are shown in a fixing position in FIG. 10. The transport mover 32 shown at the left has a support 36 for the tray 38 and a boundary 56. The transport mover 32 shown at the right likewise has a boundary 56. Two different formats of trays 38 are indicated by chain-dotted lines; they lie on the support 36 and are secured by the boundaries 56. The boundaries 56 have a rectangular base shape with chamfered corner regions so that trays 38 of different sizes and of different shapes can be reliably secured on the support 36. A format change can be made very easily in this respect in that inter alia the spacings of the transport movers 32 in the path system 34 are adapted accordingly by means of the control device.

Figure 11:
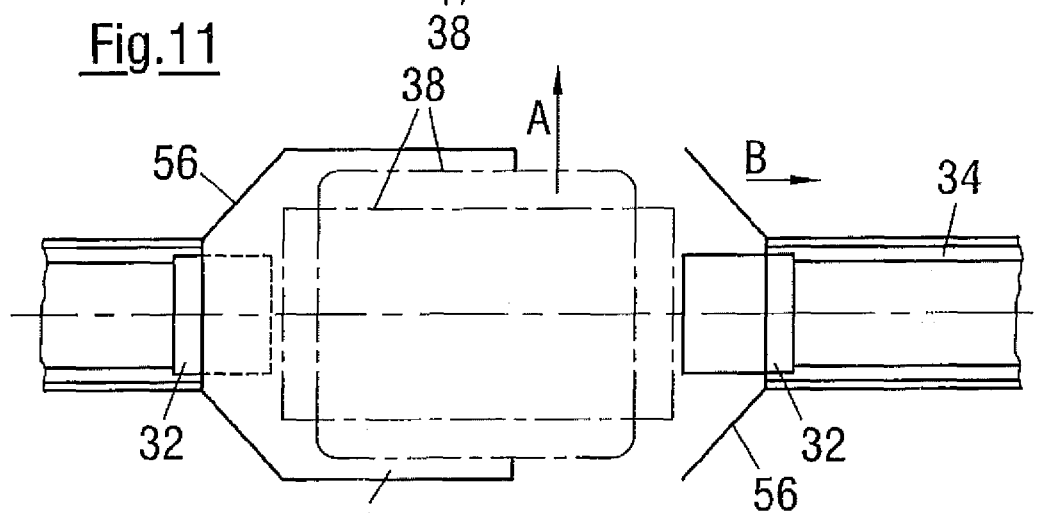
FIG. 11 shows the two transport movers of FIG. 10 in a release position.

The transport movers 32 of FIG. 10 are shown in a release position in FIG. 11. The transport movers 32 therefore have a larger spacing from one another with respect to the fixing position of FIG. 10. A tray 38 is thereby no longer secured by the boundaries 56 on the support 36. The tray 38 can therefore be delivered in a delivery direction A transversely to the transport direction B of the transport movers 32.

Figure 12:
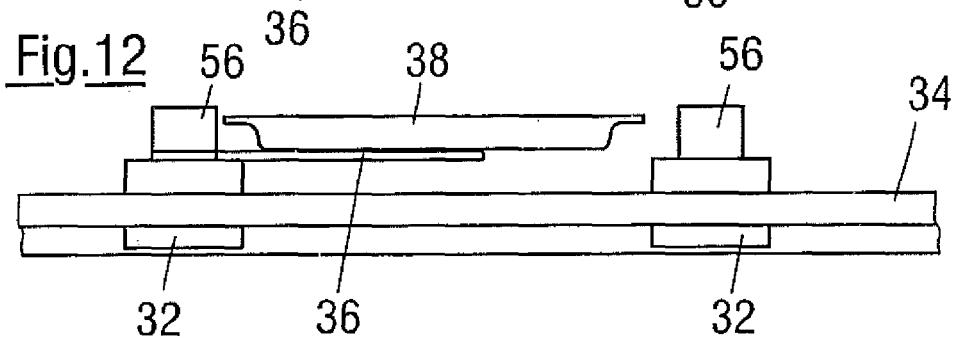
FIG. 12 shows the transport movers of FIGS. 10 and 11 in a side view.

The embodiment of FIGS. 10 and 11 is shown in a side view in FIG. 12. The two transport movers 32 are movable horizontally along the path system 34 and are shown in the release position. The tray 38 lies on the support 36 of the transport mover 32 shown at the left. The boundaries 56 of the transport movers 32 do not secure the tray 38 in this release position so that the tray 38 can be delivered in a direction perpendicular to the image plane.

Figure 13:
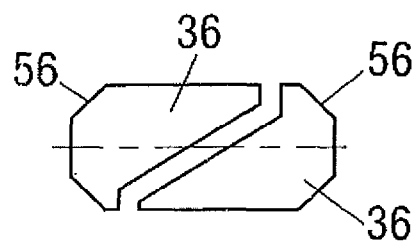
FIG. 13 shows a two-part embodiment of a support.

FIG. 13 shows an embodiment of a two-part support 36 in a plan view, with a part thereof being respectively carried by a respective transport mover 32 hidden in the image. The support 36 is bounded by boundaries 56 for a tray 38, not shown, that are arranged at the front and at the rear with respect to the movement direction. The two parts of the support 36 are movable relative to one another with their respective transport movers 32 and form complementary contact lines on their side remote from the respective other part. These complementary contact lines or the parts of the support 36 are slanted such that a tray 38, e.g. a rectangular tray, is carried on the support 36 even though the parts of the support 36 have a spacing from one another. A falling down of the tray 38 can thus also be securely prevented in a release position of the transport movers 32.

Figure 14:
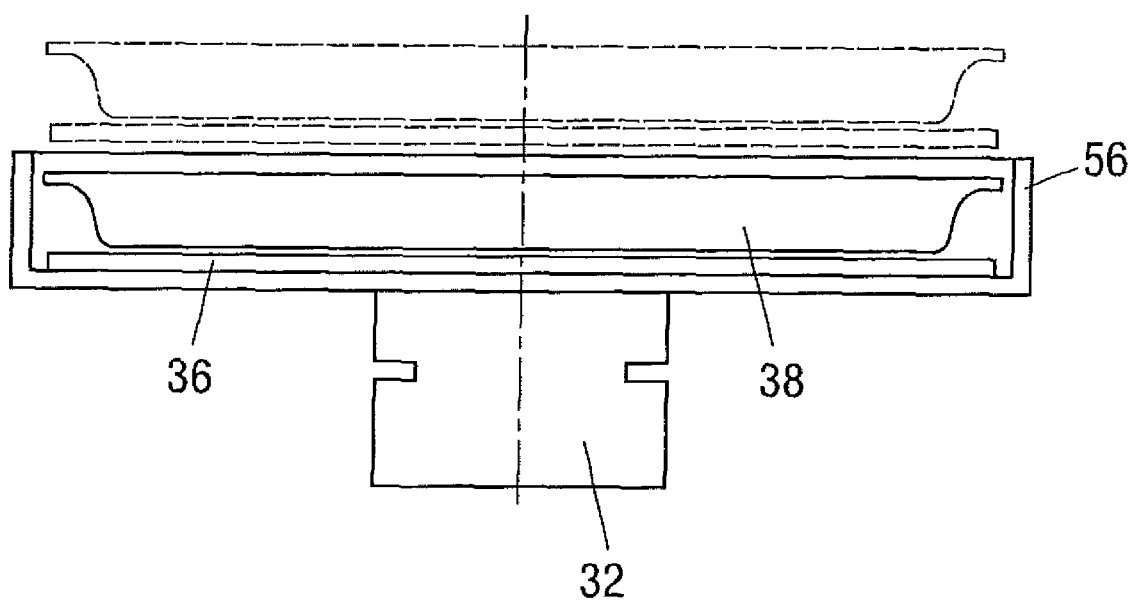
FIG. 14 shows a transport mover having a raisable support for a tray.

A transport mover 32 is shown in a sectional view in FIG. 14 with a support 36 for a tray 38 that moves in a transport direction B perpendicular to the image plane along a path system 34, not shown. The support 36 and the tray 38 are surrounded by a boundary 56 so that the tray 38 is secured against a movement in the horizontal direction. The support 36 is raisable into a release position indicated by dashed lines and is lowerable out of said release position. The tray 38 can therefore be raised out of the effective region of the boundary 56 by raising the support 36 to be able to be delivered in the release position. In other words, the boundary 56 forms a frame that is present at times for the tray 38 that disappears when the support 36 is raised.

Figure 15:
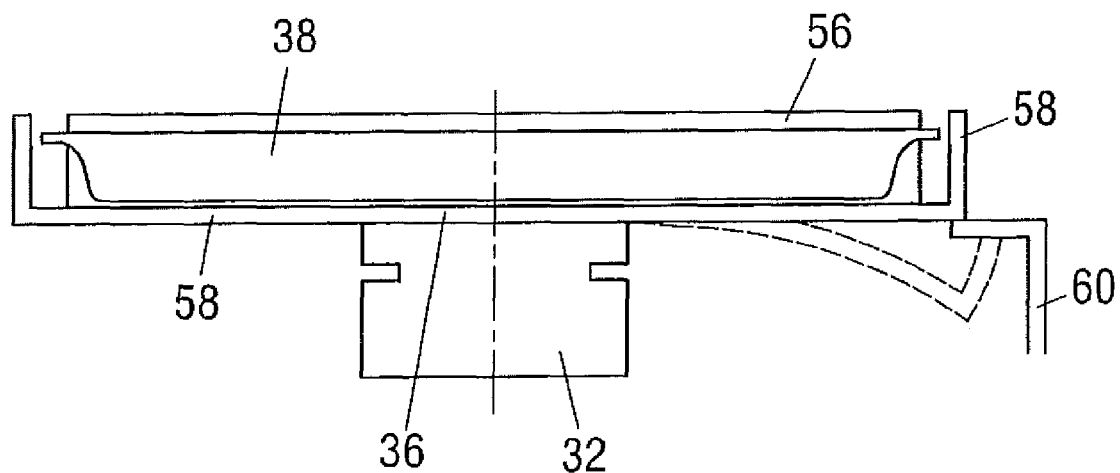
FIG. 15 shows a transport mover having spring clips as a support for a tray.

FIG. 15 shows a transport mover 32 likewise movable perpendicular to the image plane in a sectional view, said transport mover carrying a tray 38 on a support 36. The support 36 has spring clips 58 that are downwardly bendable by an actuation device 60 at the path side such as a run-on chamfer or a ramp, such as is indicated by dashed lines at the right hand side in the image. In their starting position or in the fixing position, the spring clips 58 bound the tray 38 with respect to a movement in the horizontal direction transversely to the transport direction B of the transport mover 32. In the release position indicated by dashed lines, the tray 38 is not secured with respect to such a movement and can be delivered transversely to the transport direction B. The tray 38 is secured by a boundary 56 with respect to a movement along the transport direction B relative to the transport mover 32.

Figure 16:
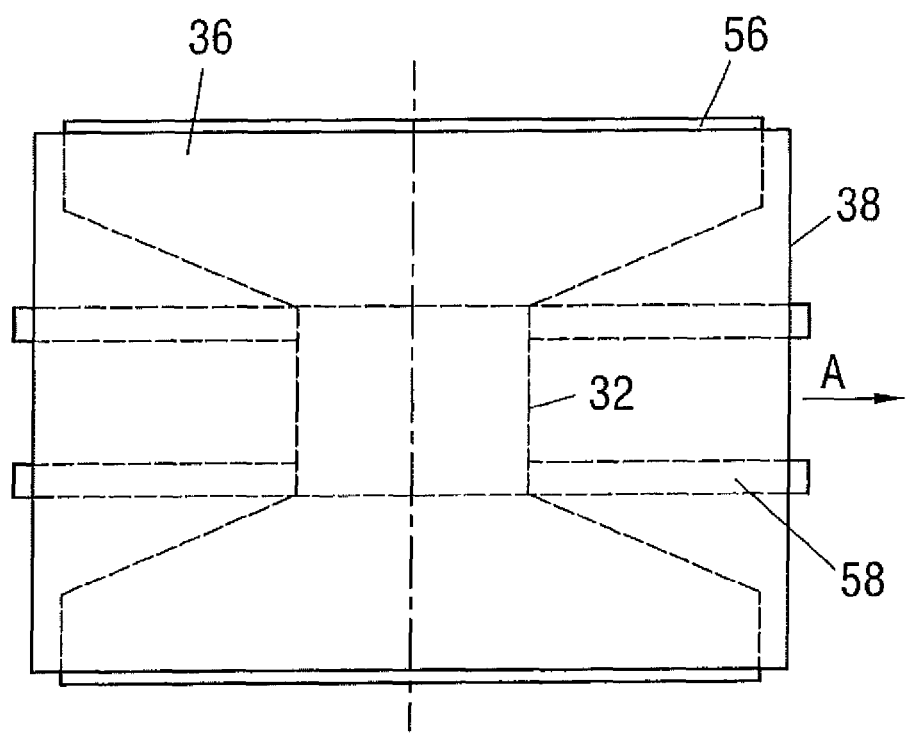
FIG. 16 shows the transport mover of FIG. 15 in a view from above.

FIG. 16 shows the transport mover 32 of FIG. 15 in a plan view. The elements of the transport mover 32 hidden by the tray 38 are indicated by dashed lines. The transport mover 32 forms a support 36, with the spring clips 38 forming a part of the support 36, while the other part of the support 36 is rigid. The tray 38 is fixed with respect to a movement in the vertical direction in the image by means of boundaries 56. After deformation of the spring clips 58 into a release position, the tray 38 can be delivered in the delivery direction A transversely to the transport direction B, that is in the horizontal direction in the image. The spring clips 58 can, as shown, be arranged in the transverse direction and/or in the longitudinal direction, with one or more spring clips 58 being able to be respectively arranged at one side. The spring clips 58 of the transport mover 32 can also serve alone as a support 36 and/or as a carrier for the tray 38 and can be bent downwardly by an external force influence, that is by a force influence at the path side, so that the tray 38 can be pushed off the support 36. It is understood that the spring clips 58 shown at the left in the embodiment of FIGS. 15 and 16 can equally be bent so that the tray 38 can be delivered or pushed off to the left.

Figure 17:
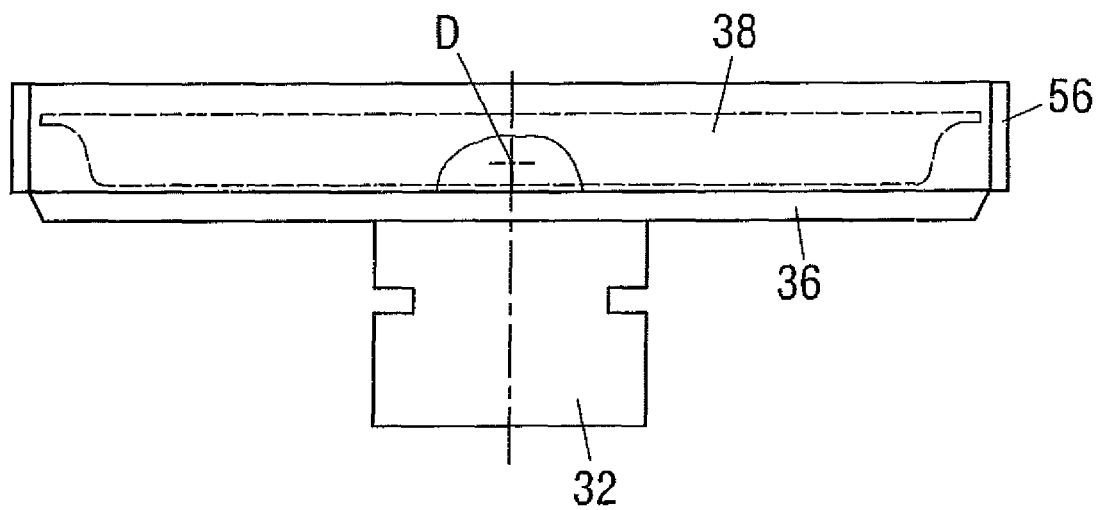
FIG. 17 shows a transport mover having a pivotable boundary for a tray.

A transport mover 32 having a support 36 for a tray 38 is shown in FIG. 17; it is surrounded by a boundary 56 and is therefore indicated by dashed lines. The boundary 56 is rotatable about an axis of rotation D that extends perpendicular to the image plane and in parallel with the transport direction B. The boundary 56 in FIG. 17 is shown in its starting position, that is in a fixing position.

Figure 18:
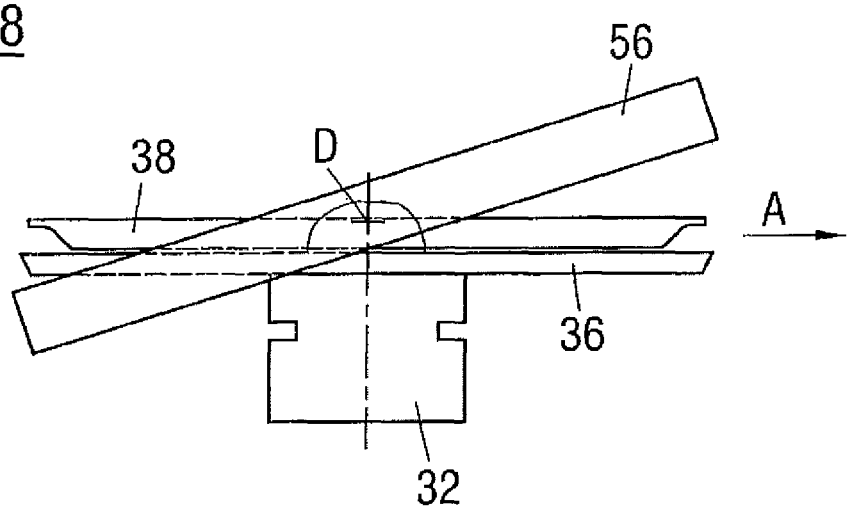
FIG. 18 shows the transport mover of FIG. 17 with a pivoted boundary.

The boundary 56 of the transport mover 32 of the embodiment of FIG. 17 is shown rotated in FIG. 18, that is in a release position. To reach the release position, the boundary 56 was e.g. rotated about the axis of rotation D by actuation means arranged at the path system 34, not shown. The boundary 56 thereby no longer bounds the tray 38 with respect to a movement transversely to the transport direction B, that is in the horizontal direction in the image. The tray 38 can thus be delivered to the left or right of the support 36 in a delivery direction A. In other words, the tray 38 lies on the support 36 as a rigid plate fixed to the transport mover 32. The boundary 56 can also be formed as an enclosure, a frame, a grid, bars and the like and is mounted at two oppositely disposed points rotatably at the support 36 or at the carrier of the transport mover 32. The tray 38 can be placed on from above in the fixing position of FIG. 17 and/or can be received in the boundary 56 and can be pushed off toward one side in the release position or can be received from one side. The boundary 56 can e.g. be held by a spring force in the fixing position or can be fixed in the fixing position by a latching means (releasable from the outside). The actuation means at the path side can e.g. mechanically, pneumatically and/or magnetically effect a rotation or pivoting of the boundary 56.

A support 36 for carrying a tray 38 is shown in FIG. 19 and is formed as deformable. The tray 38 deforms the support 36 by its weight so that one or more displacement sections 64 are formed around the tray 38. The displacement sections 64 secure the tray 38 with respect to a movement in the horizontal direction. The tray 38 therefore shapes its own bed in the support 36, said bed being matched to the shape of the tray 38. The shaping procedure can e.g. be reinforced or supported by an additional pressing of the tray 38 into the support 36. The displacement sections 34 form a boundary around the tray 38.

The support 36 of FIG. 19 is shown in FIG. 20 after it has had a force exerted on it from both sides by jaws 66 of an actuation device to be moved into a release position. The tray 38 was thereby raised from its bed, with the bed, the displacement sections 64 and the boundary for the tray 38 having disappeared. In other words, the support 36 was deformed by the jaws 64 such that the surface of the support 36 facing the tray 38 is arched upwardly, with the displacement sections 64 forming a boundary and securing the tray 38 horizontally in FIG. 19 having disappeared. The support 36 can also be acted on more powerfully by a force or by a pressure than shown in FIG. 20 so that the surface of the support 36 facing the tray 38 arches further, in particular convexly, upwardly to further simplify a delivery of the tray 38 from the support 36.

In FIG. 21, two mutually associated transport movers 32 are shown in a path 78 of the path system, said transport movers each having a laterally protruding support region 72 for trays 38 to be transported (indicated by way of example by a chain dotted circle). The supports of these two movers 32 providing these support regions 72 are each substantially L-shaped and are configured in mirror-inverted form with respect to one another in this embodiment. In this manner, a free space is also present between the movers 32 in the region of the path system 78 comprising the guides 76 when the protruding support regions 72 of the two supports provide, in accordance with the situation in FIG. 21, a contiguous total support surface for the trays 38 or a total support surface at most interrupted by a small gap.

To deliver the trays 38—by dropping them in this embodiment—the two movers 32 are moved away from one another in opposite directions, as is indicated by the two arrows in FIG. 21.

The embodiment shown in FIG. 22 corresponds to that of FIG. 21, with each mover 32 additionally being provided with a delivery aid 74 configured as a scraper or as a scooper. The scrapers 74 are each fastened to the one mover 32 and extend to the support region 72 of the other mover 32 so that they can cooperate on the moving apart of the two movers 32 with the trays 38 in a respective desired manner depending inter alia on the design of the scrapers 74.

The scrapers 74 can each be rigid and can be at least substantially adapted with their outreach to the travel path of the two movers 32. Alternatively or additionally, the scraper 74 extending toward a support region 72 can move along with said support region 72 when the two movers 32 are moved away from one another.

The scrapers 74 can be elastically deflectable to be able to yield on a moving apart of the movers 32, e.g. when they come into contact with the trays 38 and the trays 38 then lie on the support region or regions 72 only in part.

The design and the arrangement of the scrapers 74 also depends on the property of the respective trays 38. It is also possible to comb off the support regions 72 by means of the scrapers 74 in each case. The scrapers 74 can generally cooperate with the trays 38 in any desired vertical position.

It is also possible, for example, to use blade-like or wire-like scrapers 74 that are moved between the lower side of the trays 38 and the upper side of the surface regions 72 when the movers 32 are moved apart in order to separate or release the trays 38 from the support surfaces 72 in this manner such that the support regions 72 can be moved away better beneath the trays 38.

Alternatively or in addition to scrapers 74 moved along with the movers 32, a fixing device can be provided that is fixed in the movement direction of the movers 32, that is stationary relative thereto and that e.g. has a frame-like design and can be lowered in the region of the respective delivery position of the trays 38 onto a tray respectively lying on the common support region of the two movers 32 and that engages around or over this tray. A fixing frame can in this respect be placed around the tray, for example. The tray 38 is hereby held fast on the moving apart of the movers 32 at least in the movement direction of the movers 32 themselves when the tray 38 for whatever reasons adheres to the support regions 72 of the movers 32. It is ensured in this manner that trays 38 to be delivered by dropping remain at the respective predefined delivery position when the movers 32 are moved part to generate a "delivery opening".

The moving apart of the movers 32 preferably generally takes place simultaneously to the extent that the two movers 32 are each moved in opposite directions at the same speed and over the same route line.

REFERENCE NUMERAL LIST 32 transport mover
33 pushing means
34 path system
36 support
37 surface
38 receiver, tray
39 clamping device
40 clamping member
42 actuation nose
44 locking device
46 elevated portion
48 recess
50 margin
52 guide
54 tilt bearing
56 boundary
58 spring clip
60 actuation device
64 displacement section
66 jaw
68 runner
70 carrier 72 support region
74 delivery aid
76 guide
78 path
A delivery direction
B transport direction
D axis of rotation

The invention claimed is:

1. An apparatus for moving objects, the apparatus comprising
a plurality of individually movable transport movers for a respective at least one object;
a path system for the plurality of transport movers in which the plurality of transport movers are movable in a transport direction along at least one predefined path;
a control device for controlling the movements of the plurality of transport movers in the path system, wherein at least one transport mover has at least one support that is free of a frame at all times or at least at times for at least a part of a receiver for receiving at least one object to be moved; and wherein fixing means are provided in addition to the at least one support that are configured for at least temporary fixing of the receiver on the at least one support, the at least one support being located in a protruding position at least temporarily in which at least a support region of the at least one support for the receiver laterally protrudes; and
at least one pair of cooperating transport movers that form, together with their respective receivers, a common, laterally protruding support region for the receiver.

2. The apparatus in accordance with claim 1, wherein the plurality of transport movers each comprise at least one runner cooperating with the path system, with at least one transport mover comprising at least one carrier attached to the runner, said carrier at least one of operatively connected to the frame-free support.

3. The apparatus in accordance with claim 1, wherein the fixing means are configured for generating a retaining force that is substantially effective in a horizontal direction and/or in a plane in parallel with the transport direction.

4. The apparatus in accordance with claim 1, wherein the fixing means are configured to hold the receiver by friction locking.

5. The apparatus in accordance with claim 1, wherein the fixing means are configured to hold the receiver by adhesion.

6. The apparatus in accordance with claim 1, wherein the fixing means are configured to hold the receiver by means of vacuum.

7. The apparatus in accordance with claim 1, wherein the fixing means are adjustable between a fixing position and a release position for the receiver.

8. The apparatus in accordance with claim 7, wherein the fixing means are adjustable by passing an actuation point.

9. The apparatus in accordance with claim 1, wherein fixing means adjustable between a fixing position and a release position form at least a part of the at least one support.

10. The apparatus in accordance with claim 1, wherein the fixing means comprise a clamping device that is configured to fix the receiver to one or more clamping points.

11. The apparatus in accordance with claim 10, wherein the clamping device is configured to clamp the receiver between at least one clamping member and the frame-free support.

12. The apparatus in accordance with claim 1, wherein the at least one support is provided with a non-planar geometry as the fixing means.

13. The apparatus in accordance with claim 1, wherein the fixing means comprise one or more elevated portions that project beyond a support surface of the at least one support in a fixing position.

14. The apparatus in accordance with claim 1, wherein the fixing means for at least a part of a support surface of the at least one support comprising at least one boundary portion that is adjustable relative to the support surface.

15. The apparatus in accordance with claim 1, wherein the at least one support is formed by at least one of two consecutively moved transport movers, with at least one of the transport movers having a support region for a receiver held between the transport movers.

16. The apparatus in accordance with claim 15, wherein the at least one support and/or a boundary formed by or present at least one of the transport movers is formed together by the transport movers.

17. The apparatus in accordance with claim 1, wherein the two transport movers are movable relative to one another for the delivery of receivers such that the support regions are movable away beneath the receivers.

18. The apparatus in accordance with claim 1, wherein at least one of the receiver regions of the two transport movers is movable relative to a delivery aid cooperating with the at least one support on the delivery.

19. The apparatus in accordance with claim 18, wherein the delivery aid is configured as a scraper or as a fixer.

20. A system having an apparatus and a receiver for receiving at least one object to be moved by means of the apparatus, the apparatus comprising a plurality of individually movable transport movers for a respective at least one object;
a path system for the plurality of transport movers in which the plurality of transport movers are movable in a transport direction along at least one predefined path;
a control device for controlling the movements of the plurality of transport movers in the path system, wherein at least one transport mover has at least one support that is free of a frame at all times or at least at times for at least a part of a receiver for receiving at least one object to be moved; and wherein the receiver and the at least one support have cooperating fixing means that are configured such that the receiver is fixed on the at least one support at least at times by the cooperation of the fixing means, the at least one support being located in a protruding position at least temporarily in which at least a support region of the at least one support for the receiver laterally protrudes; and
at least one pair of cooperating transport movers that form, together with their respective receivers, a common, laterally protruding support region for the receiver.

21. The system in accordance with claim 20, wherein the receiver is configured to engage around and/or to engage behind the at least one support at least regionally and/or to grip laterally past the at least one support beneath a support surface of the at least one support.

* * * * *